United States Patent [19]

Mullins

[11] 4,147,072
[45] Apr. 3, 1979

[54] COMPATIBLE ANGLED GEAR SYSTEM

[76] Inventor: Max Mullins, c/o Mrs. Nel Mullins, 13700 NE. Miami Ct., Miami, Fla. 33161

[21] Appl. No.: 832,435

[22] Filed: Sep. 12, 1977

[51] Int. Cl.² .......................... F16H 1/12; F16H 55/06
[52] U.S. Cl. .......................................... 74/416; 74/462
[58] Field of Search ...................... 74/416, 424.5, 462, 74/466, 412 R, 421 R, 424.7

[56] References Cited

U.S. PATENT DOCUMENTS 599,065  2/1898  Pincus ............................... 74/416 X Primary Examiner—Leonard H. Gerin
Attorney, Agent, or Firm—Gustave Miller

[57] ABSTRACT

This is a compatible angled gear system wherein the shafts of the pair of meshing gears are at an angle to each other, ranging between a maximum angle of ninety degrees to a minimum angle of forty-five degrees, and wherein the limits of the angles of the gear teeth range correspondingly between forty-five degrees to a minimum of twenty-two and one-half degrees, the angle of the shafts to each other always being just twice the angle of the meshing gear teeth. The gear teeth of the meshing gears are always in a straight line at their point of contact. There is always an odd number of gear teeth in such gears, and the minimum number of teeth for each gear is always five; rights fit rights and lefts fit lefts, with the shafts at an angle to each other.

4 Claims, 2 Drawing Figures

COMPATIBLE ANGLED GEAR SYSTEM

SUMMARY OF THE INVENTION

This invention is an angled gear system providing compatible gear and gear-teeth that are more efficient, much stronger, more endurable than conventional gears and gear-teeth and can transmit much more power than conventional gear systems. The gears of this system always have an odd number of teeth, five or more, and will mesh with similar gears having an odd number of teeth, five or more, as set forth in the table in this specification. The shafts of the pair of meshing gears are at an angle to each other ranging between a maximum angle of ninety degrees degrees to a minimum angle of forty-five degrees, and limits of the angles of the gear teeth to the sides of the gear range correspondingly between forty-five degrees to a minimum of twenty-two and a half degrees, the angle of the shafts to each other always being just twice the angle of the meshing gear teeth. Rights fit rights and lefts fit lefts.

The principles of this invention are along the line of those disclosed in applications of the present inventor filed June 21, 1977, Ser. No. 808,469 for Cpmpatible Gear System, and Ser. No. 808,470 for Compatible Sprocket and Chain System.

OBJECTS OF THE INVENTION

It is an object of this invention to provide a gear system wherein the gear shafts of meshing gear teeth are at an angle to each other, ranging between a maximum of ninety degrees to a minimum of forty-five degrees, and the gear teeth meet in straight line contact and the limits of the angles of the gear teeth to the gear face or gear sides correspondingly range between a maximum of forty-five degrees to a minimum of twenty-two and one-half degrees, the angles of the shafts to each other being always just twice the angle of the meshing gear teeth.

A further object of this invention is to provide a gear system that is more efficient, much stronger and more durable than conventional systems involving gear shafts at an angle to each other.

A further object of this invention is to provide a gear system wherein each meshing gear has an odd number of teeth, five or more.

Yet a further object of this invention is to provide an efficient gear system wherein each gear of this system may have the same odd number of teeth or where meshing gears may have different odd numbers of teeth in accordance with the table hereinafter set forth in the specification.

BRIEF DESCRIPTION OF THE INVENTION

With the foregoing and other objects in view, this invention comprises the combinations, constructions and arrangement of parts hereinafter set forth, claimed and disclosed in the accompanying drawing, in which:

DETAILED DESCRIPTION OF THE INVENTION

Figures 1, 2:
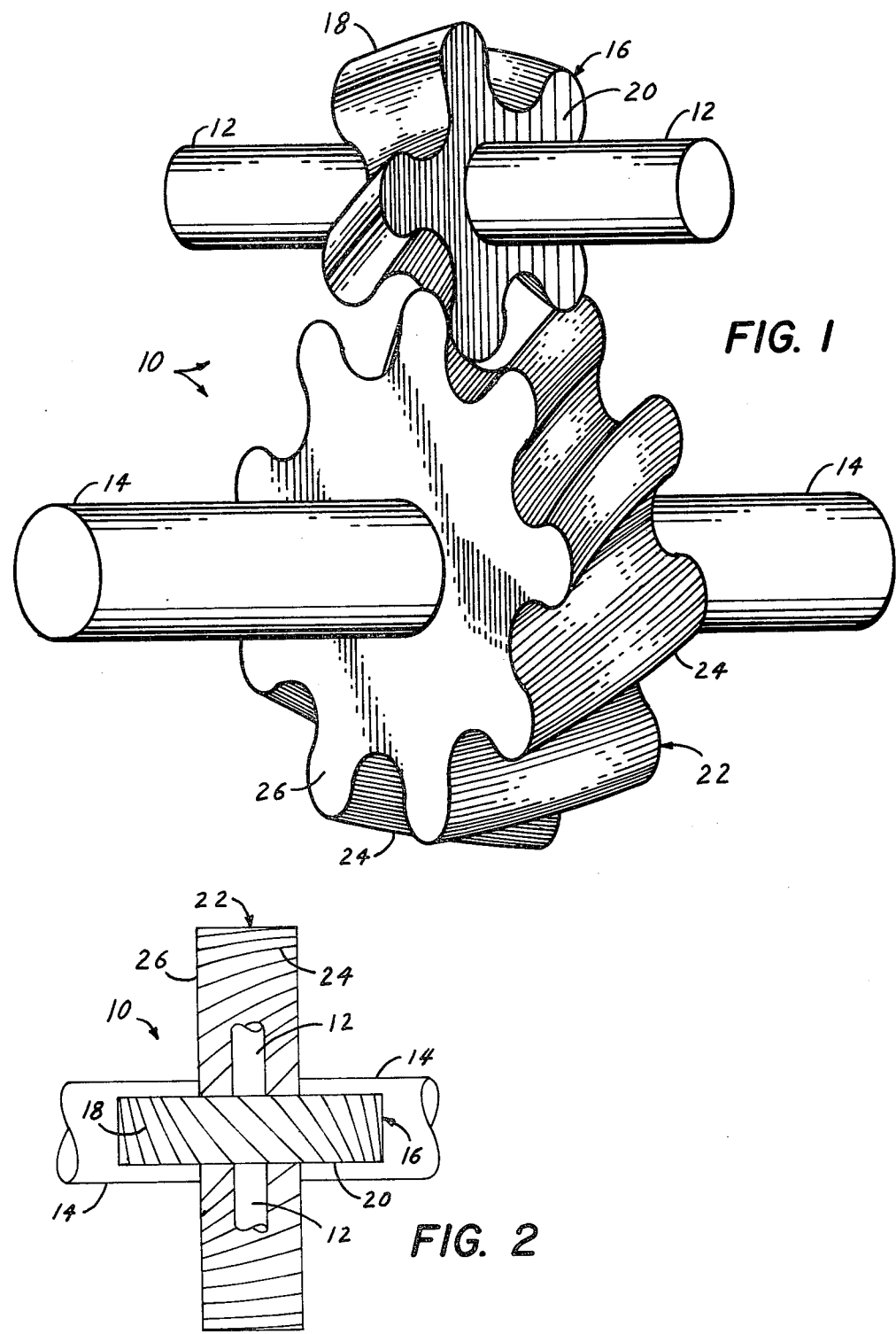
FIG. 1 is a perspective view of two meshing gears of this invention, their shafts being at a right angle to each other.
FIG. 2 is an elevational view, on a smaller scale, schematically shown.

There is shown at 10 a pair of shafts 12 and 14, incidentally of different diameters, at a right angle to each other, the shaft 12 being of a smaller diameter than the shaft 14. Fixed on the smaller shaft 12 is a gear 16 having its teeth 18 at a forty-five degree angle to the face of the gear 16 and to the side 20 of the gear 12, and, correspondingly, the larger diameter shaft 14 has the larger gear 22 with its larger gear teeth 24 of necessity at the same forty-five degree angle to the gear face and to the side 26 of the larger gear 22.

As shown, the smaller gear 12 has five gear teeth 18, five being the smallest number of teeth that a gear of this invention may have.

On the larger gear 22, there are nine gear teeth 24, this number of teeth being compatible with the number of gear teeth 18 on the smaller gear 12. The gear teeth in both gears must of necessity be either both lefts or both rights, and lefts are illustrated herein.

As shown, the teeth 18 and 24 of both gears 12 and 14 of necessity meet and mesh in a straight line with each other at their lines of contact.

As illustrated, the shafts 12 and 14 are at ninety degrees to each other, which is the maximum possible angle, and the gear teeth 18 and 24 are of necessity at forty-five degrees to each other, which is the maximum possible angle for both shafts and gear teeth. The minimum possible angle for both shafts and gear teeth is forty-five degrees for the shafts and twenty-two and one-half degrees for the teeth. Thus, the angle of the shafts 12 and 14 is always exactly twice the angle of the teeth 18 and 24, and may range anywhere within these maximum and minimum angles as long as the angle of the shafts is exactly just twice the angle of the teeth.

The number of teeth in each gear must always be an odd number, the minimum number being five, and both gears always have either the same number of teeth, or one gear may have a greater number of teeth than the other only in accordance with the following table.

TABLE 5 teeth fit 5, or 9, or 11, or 13, increasing by 2's indefinitely, 7 teeth fit 7, or 13, or 15, or 17, or 19, increasing by 2's indefinitely, 9 teeth fit 9, or 17, or 19, or 21, or 23, increasing by 2's indefinitely, 11 teeth fit 11, or 21, or 23, or 25, or 27, increasing by 2's indefinitely, 13 teeth fit 13, or 25, or 27, or 29, or 31, increasing by 2's indefinitely, 15 teeth fit 15, or 29, or 31, or 33, or 35, increasing by 2's indefinitely, 17 teeth fit 17, or 33, or 35, or 37, or 39, increasing by 2's indefinitely, 19 teeth fit 19, or 37, or 39, or 41, or 43, increasing by 2's indefinitely, 21 teeth fit 21, or 41, or 43, or 45, or 47, increasing by 2's indefinitely, and thus continue with this same pattern of odd numbers.

In this table, it will be noted that the number in the third column is always one less than the sum of the two identical numbers in the first two columns, and that, thereafter, successive columns increase by 2's indefinitely, horizontally, and that vertically, the first two columns increase by 2's indefinitely, while in subsequently vertical columns, the subsequent columns of necessity increase by 4's indefinitely.

ABSTRACT OF THE DRAWING

In the drawing, like numbers refer to like parts, and for the purpose of explication, marshalled below are the numbered parts of the improved COMPATIBLE ANGLED GEAR SYSTEM of this invention:

10 pair of shafts 12 and 14
12 smaller shaft
14 larger shaft
16 smaller gear
18 teeth of small gear 16
20 side of smaller gear 16
22 larger gear
24 teeth of larger gear 22
26 side of larger gear 22

Although this invention has been described in considerable detail, such description is intended as being illustrative rather than limiting, since the invention may be variously embodied.

Having thus set forth and disclosed the nature of this invention, what is claimed is:

1. A compatible angled gear system (10) comprising two gear shafts (12, 14), at an angle to each other, the angle of the two gear shafts to each other ranging between maximum of ninety degrees to a minimum of forty-five degrees, the limit of angle of the gear teeth (18, 24) to the gear face ranging from a corresponding maximum of forty-five degrees to a minimum of twenty-two and one-half degrees to the gear face, there being an odd number of gear teeth on each gear with a minimum of five teeth on each gear, the angle of the shafts always being exactly twice the angle of the gear teeth.

2. The gear system of claim 1, the gear teeth (18, 24) of the meshing gears (16, 22) always meeting in a straight line at their line of contact.

3. The gear system of claim 2, both gears having their teeth extending only to the left or only to the right.

4. The gear system of claim 1, wherein the number of gear teeth (26) in one gear (24) may be increased relative to the other gear (18) only in accordance with the following table:

5 teeth fit 5, or 9, or 11, or 13, increasing by 2's indefinitely,
7 teeth fit 7, or 13, or 15, or 17, or 19, increasing by 2's indefinitely,
9 teeth fit 9, or 17, or 19, or 21, or 23, increasing by 2's indefinitely,
11 teeth fit 11, or 21, or 23, or 25, or 27, increasing by 2's indefinitely,
13 teeth fit 13, or 25, or 27, or 29, or 31, increasing by 2's indefinitely,
15 teeth fit 15, or 29, or 31, or 33, or 35, increasing by 2's indefinitely,
17 teeth fit 17, or 33, or 35, or 37, or 39, increasing by 2's indefinitely,
19 teeth fit 19, or 37, or 39, or 41, or 43, increasing by 2's indefinitely,
21 teeth fit 21, or 41, or 43, or 45, or 47, increasing by 2's indefinitely,
thus continuing with this same pattern of odd numbers.

* * * * *